US005625734A

United States Patent [19]
Thomas et al.

[11] Patent Number: 5,625,734
[45] Date of Patent: Apr. 29, 1997

[54] OPTOELECTRONIC INTERCONNECT DEVICE AND METHOD OF MAKING

[75] Inventors: Ronald E. Thomas, Tempe; Michael S. Lebby, Apache Junction; Davis H. Hartman, Phoenix; David Galloway, Tempe, all of Ariz.

[73] Assignee: Motorola, Schaumburg, Ill.

[21] Appl. No.: 455,873

[22] Filed: May 31, 1995

[51] Int. Cl.⁶ .................................. G02B 6/36; H01L 21/70
[52] U.S. Cl. ........................ 385/88; 385/89; 385/14; 385/38; 385/90; 385/126; 385/131; 385/132; 385/129; 385/123; 385/76; 438/27; 438/25
[58] Field of Search ............................ 385/89, 14, 38, 385/90, 126, 131, 132, 129, 123, 88, 76; 264/1.1, 1.4, 1.5, 1.7, 2.7; 437/51, 204, 205, 206, 209, 249, 250, 207

[56] References Cited

U.S. PATENT DOCUMENTS

| | | | |
|---|---|---|---|
| 5,249,245 | 9/1993 | Lebby et al. | 385/89 |
| 5,276,754 | 1/1994 | Blair et al. | 385/88 |
| 5,361,317 | 11/1994 | Hartman et al. | 385/43 |
| 5,452,387 | 9/1995 | Chun et al. | 385/88 |

*Primary Examiner*—Brian Healy
*Attorney, Agent, or Firm*—Eugene A. Parsons

[57] ABSTRACT

A waveguide (12) having a core region (16) and a cladding region (20) is formed. A portion of the cladding region (20) forms a first surface (21) and portions of both the core region (16) and the cladding region (20) forms an end surface (15). An insulative flexible substrate (14) having an electrically conductive tracing (32) with a first portion and a second portion, wherein the first portion of the insulative flexible substrate (14) is mounted on the end surface of the waveguide (12).

3 Claims, 2 Drawing Sheets

OPTOELECTRONIC INTERCONNECT DEVICE AND METHOD OF MAKING

FIELD OF THE INVENTION

This invention relates, in general, to fabrication of optical devices and, more particularly, to interconnecting optical devices and waveguides together.

BACKGROUND OF THE INVENTION

This application is related to patents bearing U.S. Pat. Nos. 5,265,184 and 5,249,245, titled MOLDED WAVEGUIDE AND METHOD OF MAKING SAME and OPTOELECTRONIC MOUNT INCLUDING FLEXIBLE SUBSTRATE AND METHOD FOR MAKING SAME, issued on Nov. 23 and Sep. 28, 1993, respectively, which are hereby incorporated by reference herein.

Presently, coupling of an optical device, a waveguide, and an interconnect substrate is a difficult task that typically is achieved either manually or semiautomatically. However, these methods have several problems, such as being complex, being inefficient, and not suitable for high volume manufacturing. Since these problems limit high volume manufacturing, incorporation of optical devices with standard electronic components is a difficult task, thus not enabling advantages of optical devices to be incorporated with standard electronic components.

By way of example, conventional interconnection of an optical device and a waveguide typically is achieved by carefully aligning the optical device to the waveguide manually, commonly referred to as active alignment. Once the optical device is aligned to the waveguide, the optical device is affixed to the waveguide. However, several problems arise by aligning the optical device and the waveguide manually, such as being extremely labor intensive, being costly, and being inaccurate. Further, curing of an adhesive that affixes or binds the optical device to the waveguide often shift the alignment of the optical device to the waveguide, thereby causing inefficient transfer of light from the optical device. Moreover, if the misalignment is severe enough, unusable product is manufactured, thus increasing cost and reducing manufacturing capability.

Once the optical device and the waveguide have been aligned and affixed together, the optical device and waveguide are then mounted onto an interconnect substrate. However, mounting of the optical device and the waveguide to the interconnect substrate also has several problems, such as fragility of the fixed optical device and waveguide, alignment capability of the optical device and waveguide to the interconnect substrate, electrical coupling of the optical device, and the like, thus making the interconnection of the optical device, the waveguide, and the interconnect substrate unsuitable for high volume manufacturing.

It can readily be seen that conventional methods for interconnecting an optical device, a waveguide, and an interconnect substrate have severe limitations. Also, it is evident that conventional processes that are used to fabricate the interconnection between optical devices, waveguides, and interconnect substrates are not only complex and expensive, but nonamenable to high volume manufacturing. Therefore, an article and method for making interconnections between an optical device, a waveguide, and an interconnect substrate is highly desirable.

DETAILED DESCRIPTION OF THE DRAWINGS

Figure 1:
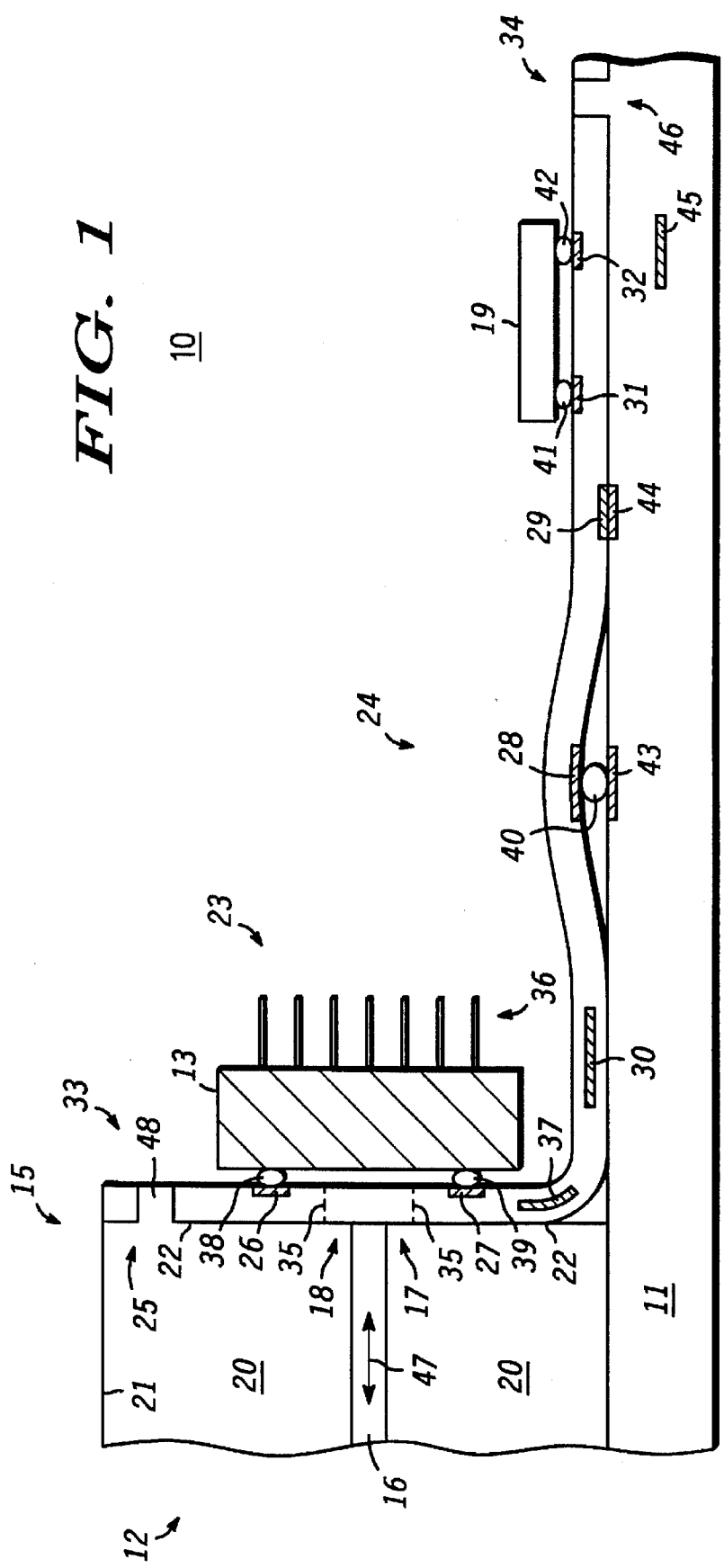
FIG. 1 illustrates a greatly enlarged simplified sectional view of an optoelectronic mount.

FIG. 1 illustrates an enlarged simplified sectional view of an optoelectronic mount 10 affixed to an interconnect substrate 11. It should be understood that FIG. 1 is a sectional view, thus enabling FIG. 1 to extend into and out of the drawing. For the sake of clearly illustrating the present invention, dimensional control and relative sizing has been relaxed. In the present invention, a novel article and combination of processes are described that allow effective integration of optical devices with standard electronic components.

Generally optoelectronic mount 10 is made of several elements, such as an interconnect substrate 11, a waveguide 12, a photonic device 13 with a working portion 18, and an insulative flexible substrate 14. Typically, as shown in FIG. 1, waveguide 12 is fabricated with several elements or features, such as a core region 16 having a surface 17, a cladding region 20 having surfaces 21 and 22, end portion 15 having portions of surfaces 17 and 22, and an alignment device 25 having a tab 48 or the like. Generally, while waveguide 12 illustrates a single core region 16 surrounded by cladding region 20, waveguide 12 typically is fabricated with a plurality of core regions that are at least partially surrounded by cladding region 20.

In the preferred embodiment of the present invention, waveguide 12 is made in accordance with the previously referenced patents. Briefly, both core region 16 and cladding region 20 are made of a hard optically transparent polymer, wherein core region 16 has a higher refractive index than cladding region 20, thus enabling internal reflection and efficient transmission of light, illustrated by arrow 47, in core region 16. Generally, the refractive index difference between core region 16 and cladding region 20 is at least 0.01.

Interconnect substrate 11 is made of any suitable substrate, such as a printed circuit board, a FR4 board, a ceramic interconnect board, or the like. Generally, interconnect substrate 11 is made with several elements or features, such as a tab 46, bonding pads 43 and 44, and an electrical trace 45. Bonding pads 43 and 44 enable electrical signals to be coupled with interconnect substrate 11. As shown in FIG. 1, bonding pads 43 and 44 electrically couple or operably couple interconnect substrate 11 with insulative flexible substrate 14; however, it should be understood that bonding pads 43 and 44 could be used for other electrical coupling, such as wire bonds, tape automated bonding (TAB), and the like. Further, while electrical trace 45 shows only a single electrical trace, it should be understood that electrical trace 45 can illustrate a plurality of electrical traces throughout interconnect substrate 11.

As shown in FIG. 1, insulative flexible substrate 14 is made of several elements or features, such as bonding pads 26, 27, 28, 29, 31, and 32, thermally conductive trace 37, an electrical trace 30, an integrated circuit 19, a window 35 (indicated by dotted lines), and openings 33 and 34. While FIG. 1 illustrates a single electrical trace 30, it should be understood that typically a plurality of electrical traces is embedded into or on insulative flexible substrate 14, thereby providing paths for electrical signals to travel throughout insulative flexible substrate 14. It should be further understood that bonding pads 26, 27, 28, 29, 31, 32 and electrical trace 30 are electrically conductive and are placed in any suitable pattern on or in insulative flexible substrate 14, thereby enabling electrical signals to be passed throughout insulative flexible substrate 14.

Thermally conductive trace 37 illustrates a method for heat removal from photonic device 13. Generally, thermally conductive trace 37 is fabricated adjacent to a high heat concentration, thereby allowing thermally conductive trace 37 to carry the heat away from the high heat concentration. By way of example, with thermally conductive trace being coupled to bonding pad 27 and bonding pad 28, the heat generated by photonic device 13 is carried away through thermally conductive trace 37 and into interconnect substrate 11, thereby cooling photonic device 13, as well as improving performance of photonic device 13. Generally, thermally conductive trace 37 can be made of any suitable material, such as indium tin oxide, or the like.

Insulative flexible substrate 14 is made by any suitable method or technique. For example, insulative flexible substrate 14 is made from any thin insulative material, such as those suitable for tape automated bonding (TAB) backing layer or substrate. Polyimide is a representative material, but is certainly not the only one; polyimide may be found under tradenames such as "UPLEX" or "KAPTON", among others. Other suitable materials include, but are not necessarily limited to, polyester material (lower in cost and performance that polyimide), mylar materials, and composite materials, e.g., a resin filled epoxy, a fiber reinforced material, or the like.

Electrical trace 30 and bonding pads 26, 27, 28, 29, 31, and 32 are formed by any suitable method, such as but not limited to plating, etching, photolithography, printing, etc. Typically, electrical trace 30 and bonding pads 26, 27, 28, 29, 31, and 32 are made of suitable electrically conductive material, such as a metal, e.g., aluminum (Al), titanium (Ti), copper (Cu), tungsten (W), silver (Ag), a metal alloy, e.g., titanium/tungsten (TiW), aluminum/copper (Al/Cu), or the like. Adhesion of electrical trace 30 and bonding pads 26, 27, 28, 29, 31, and 32 to insulative flexible film 14 is such that they will not delaminate or separate from insulative flexible substrate 14 when insulative flexible substrate 14 is bent or positioned on waveguide 12 or interconnect substrate 11. Additionally, materials selected for fabrication of insulative flexible substrate 14 generally are temperature resistant. For example, in most applications, optoelectronic mount 10 will undergo an overmolding process. Temperatures and times of duration of the overmolding process typically range from 200–300 degrees Celsius with time ranges from 10–15 minutes. Thus, material selected for fabrication of insulative flexible substrate 14 needs to be able to tolerate these temperatures and times. However, it should be evident that materials that exceed these requirements or performance levels, are also usable. While several manufacturers are capable of supplying insulative flexible substrate 14, purchase of insulative flexible substrate is available from Rogers Corporation located in Arizona.

Additionally, window 35 is formed by any suitable method, such as making window 35 an opening, making insulative flexible substrate 14 transparent, or the like, thereby allowing light 47 to pass between waveguide 12 and photonic device 13.

Photonic device 13 can be any suitable photonic device or array having a photo-transmitter, a photo-receiver, or a combination thereof. For example, with photonic device 13 being a photo-transmitter, the photo-transmitter can be any suitable device, such as a vertical cavity surface emitting laser (VCSEL), light emitting diode (LED), or the like. Alternatively, with photonic device 13 being a photo-receiver, any suitable photo-receiving device can be used, such as a photodiode, e.g., P-I-N diode, PN diode, or the like. Thus, photonic device 13 can be a broad range of photoactive devices capable of transmitting and receiving.

Additionally, photonic device 13 is represented with fins 36 that dissipate heat from photonic device 13. Fins 36 are made of any suitable heat conductive material, such as a metal, e.g., aluminum, copper, gold, an alloy, e.g., aluminum/copper, silicon/aluminum, or the like, thereby enabling heat removal from photonic device 13. By dissipating heat from photonic device 13, photonic device 13 has improved performance and long term reliability.

While integrated circuit 19 of FIG. 1 illustrates only a single integrated circuit, it should be understood that integrated circuit 19 can be a plurality of a variety of standard electronic components positioned over insulative flexible substrate 14, such as capacitors, resistors, discrete devices, and hybrid devices that can be mounted on insulative flexible substrate 14, thereby enabling a wide variety of electronic devices and components to be integrated on insulative flexible substrate 14 which can electronically process electrical signals.

Electrical coupling of photonic device 13 and integrated circuit 19 to insulative flexible substrate 14 is accomplished by any suitable method or technique, such as wire bonding, TAB bonding, bump bonding, or the like. In a preferred embodiment of the present invention, bump bonding photonic device 13 and integrated circuit 19 is achieved by bump balls 38 and 39, and 41 and 42, respectively. However, in some applications, it should be understood that bonding methods can be mixed, e.g., photonic device being bump bonded and integrated circuit being wire bonded, thus enabling the bonding method to be varied in accordance with specific applications.

Accurate placement or alignment of insulative flexible substrate 14 to waveguide 12 and to interconnect substrate 11 is achieved by any suitable method or technique, such as mechanical, machine vision, or the like, as well as any combination thereof. Any suitable mechanical alignment method or technique, such as locks and keys, tabs and openings, or the like can be used. As shown in FIG. 1, tabs 25 and 46 engage openings 33 and 34, thereby aligning insulative flexible membrane 14 to both waveguide 12 and interconnect substrate 11. However, if the mechanical alignment technique is not robust enough for the specific application, then any other suitable alignment technique, such as a robotically controlled system that uses machine vision, or the like can be used. The machine vision can be further augmented by placing alignment fiducials or alignment features on any necessary surface of waveguide 12 insulative flexible substrate 14, and interconnect substrate 11, thereby enabling reference points or alignment fiducials to be superimposed so as to provide precise specific alignment. Use of several different alignment fiducials and procedures, such as optical targets, position orientation, and openings and tabs are capable of achieving accurate placement of insulative flexible substrate 14 to waveguide 12.

Affixing or attachment of insulative flexible substrate 14 to waveguide 12 and to interconnect substrate 11 is achieved by any suitable method or technique, such as an adhesive, e.g., epoxy, polyimide, or any ultraviolet curable adhesive, or the like. Typically, insulative flexible substrate 14 is positioned and affixed to waveguide 12 by a robotic arm or the like. For example, waveguide 12 can be held either by a jig on a table or held by a robotic arm (not shown). An optically transparent epoxy is applied to surfaces 22 and 17 of waveguide 12. Insulative flexible substrate 14 subsequently is applied to waveguide 12 by a robotic arm. Placement of insulative flexible substrate 14 is aligned to waveguide 12 by any one of several alignment fiducial systems previously described. In yet another example, alignment device or tab 25 is formed on surface 22 of waveguide 12. Alignment device 25 is then recognized by a machine vision system which orients opening 33 to alignment device 25 and places opening 33 over alignment device 25, thus affixing a portion 23 of insulative flexible substrate 14 to waveguide 12.

Similarly, insulative flexible substrate 14 is aligned and attached to interconnect substrate 11, thereby affixing a portion 24 of insulative flexible substrate 14 to interconnect substrate 11. However, it should be pointed out that electrical interconnection or operatively coupling insulative flexible substrate 14 to interconnect substrate 11 can be achieved by any suitable method such as wire bonding, bump bonding, tab bonding, or the like. However, as shown in FIG. 1, insulative flexible substrate 14 is bump bonded from bonding pad 28 to bonding pad 43 through bump bond 40, thus electrically interconnecting interconnect substrate 11 with insulative flexible substrate 14, thus operatively coupling photonic device 13 to insulative flexible substrate 14. Additionally, bonding pad 29 of insulative flexible substrate 14 and bonding pad 44 of interconnect substrate 11 illustrate tab bonding of insulative flexible substrate 14 to interconnect substrate 11.

Figure 2:
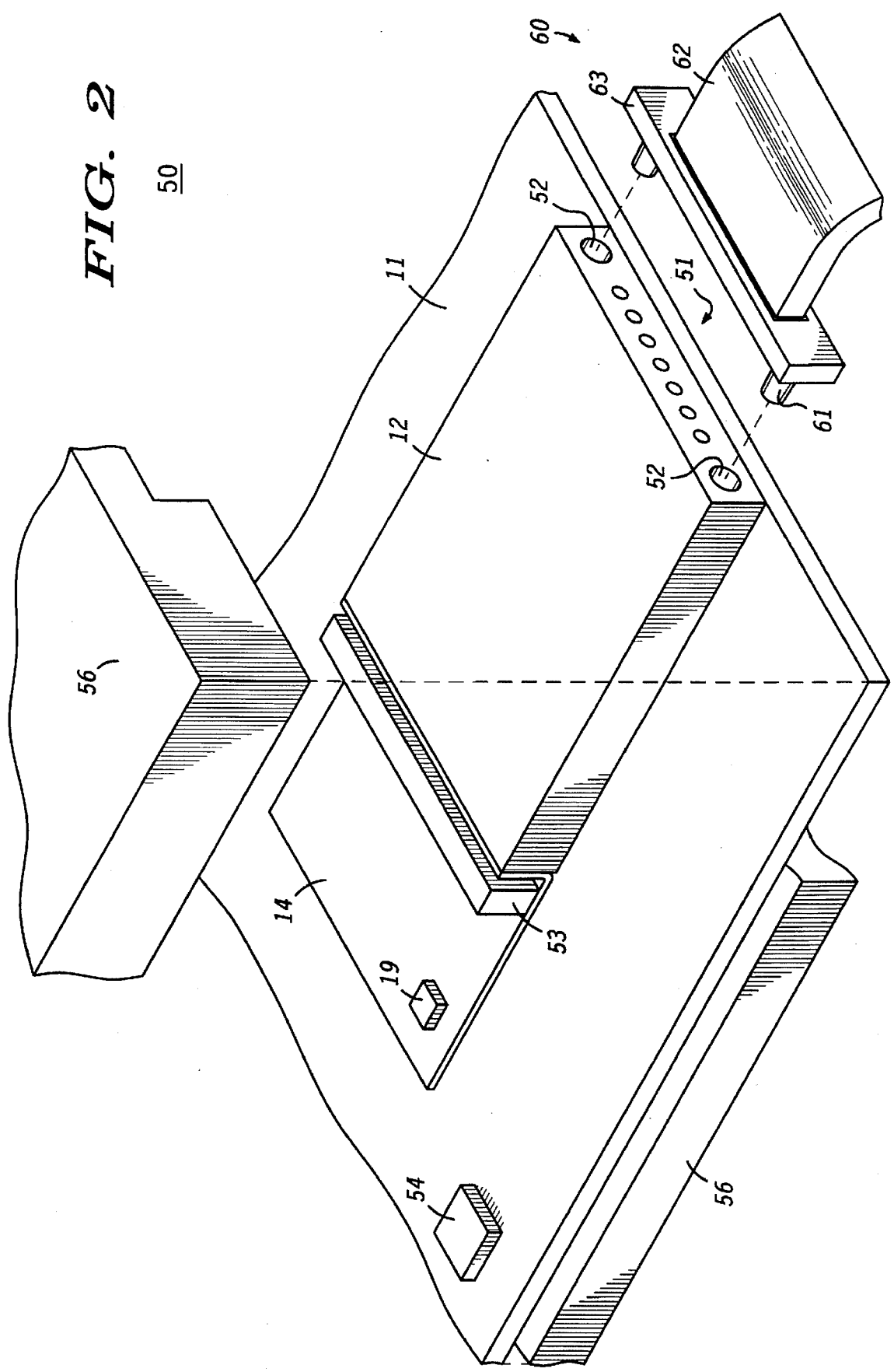
FIG. 2 is a greatly enlarged simplified exploded view of an optoelectronic module.

FIG. 2 is a simplified partially exploded pictorial illustration of an optoelectronic module 50. It should be understood that elements or features previously described in FIG. 1 will retain their original identifying numerals. Optoelectronic module 50 is made of several elements or features, such as interconnect substrate 11, waveguide 12 having a plurality of core regions 51, alignment fiducials 52, a photonic device 53, insulative flexible substrate 14, integrated circuit 19, an integrated circuit 54, and plastic portions 56. Additionally, an optical connector 60 having an optical cable 62, body 63, and an alignment guide 61 is illustrated.

As illustrated in FIG. 2, waveguide 12 is operatively coupled to photonic device 53 through insulative flexible substrate 14. Photonic device 53 is illustrated as an array spanning the plurality of core regions 51. Typically, the array can be of any suitable configuration. For example, the array can be made of individual photonic devices that are assembled or the array can be made an entire unit. Devices incorporated into the array can be phototransmitters, photoreceivers, or any combination thereof. Photonic device 53 is mounted to insulative flexible substrate 14 so that working portions of photonic device 53 are aligned to individual core regions of the plurality of core regions 51, thus providing maximum light 47 transmission through waveguide 12.

Generally, waveguide 12 is attached to interconnect substrate 11 by any suitable method or technique such as adhering, press fitting, molding, or the like. However, in a preferred embodiment of the present invention an epoxy adhesive is applied to interconnect substrate 11 at an appropriate location where waveguide 12 and interconnect substrate 11 are to be bonded. Waveguide 12 is subsequently placed into the adhesive by an automated system such as a robot arm (not shown), thereby providing accurate placement and orientation of waveguide 12.

Electrical coupling of standard electronic components, illustrated by integrated circuit 54, to insulative flexible substrate 14 is achieved by any suitable method or technique, such as wire bonding, bump bonding, TAB, or the like. It should be understood that specific selection of electrical coupling is application specific.

Further, plastic encapsulation of interconnect substrate 11, waveguide 12, insulative flexible substrate 14 is achieved by an overmolding process, represented by plastic portions 56. Plastic pieces 56 encapsulate the above mentioned elements while leaving alignment ferrules 52 and the plurality of core regions 51 open and clear of debris. Thus, optical surfaces form optical cable 62 can be mated and aligned to the plurality of core regions 51 in waveguide 12.

By now it should be appreciated that a novel optoelectronic mount and method of making have been provided. The optoelectronic mount enables the incorporation of standard electronic components and optical components such that advantages of the optical components can be utilized. Further it should be noted that the method and article of the present invention allow this integration in a cost effective manner by providing a way of eliminating costly steps carried out by hand and to automate the remaining manufacturing steps thus making the entire process highly manufacturable.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An optoelectronic interconnecting device comprising:

an interconnect substrate having alignment features positioned thereon;

a waveguide having a core region and a cladding region, wherein a portion of the cladding region forms a first surface and a portion of both the core region and the cladding region form an end surface, the waveguide including alignment features, and the waveguide being positioned on the interconnect substrate with the alignment features of the waveguide positioned relative to the alignment features of the interconnect substrate;

an insulative flexible substrate defining a first portion and a second portion and an optically transparent window extending therethrough in the first portion, the flexible substrate further including alignment means matching the alignment features of the waveguide and the alignment features of the interconnect substrate, the flexible substrate further having an electrically conductive tracing extending from the first portion to the second portion with bonding pads defined in the first portion and in the second portion, and the window and the bonding pads in the first and the second portion being positioned relative to the alignment means;

a photonic device having a working portion, the photonic device being mounted on the bonding pads of the flexible substrate with the working portion aligned with the window through the flexible substrate; and the first portion of the insulative flexible substrate being mounted on the end surface of the waveguide with the alignment features of the waveguide and the interconnect substrate and the alignment means locating the window centrally about the core region on the end surface so as to align the working portion of the photonic device with the core region of the waveguide, and the second portion of the flexible substrate being mounted on the interconnect substrate.

2. An optoelectronic interconnecting device as claimed in claim 1, including in addition an integrated circuit mounted on the bonding pads defined in the second portion of the flexible substrate.

3. A method of making an optoelectronic interconnecting device comprising the steps of:

provide an interconnect substrate and positioning alignment features thereon;

forming a waveguide with a core region and a cladding region, a portion of the cladding region defining a first surface and a portion of both the core region and the cladding region defining an end surface, and providing alignment features on the waveguide;

mounting the waveguide on the interconnect substrate and positioning the alignment features of the waveguide relative to the alignment features of the interconnect substrate;

providing an insulative flexible substrate and defining a first portion and a second portion and an optically transparent window extending through the flexible substrate in the first portion, providing alignment means on the flexible substrate matching the alignment features of the waveguide, the substrate being formed with an electrically conductive tracing extending from the first portion to the second portion with bonding pads defined in the first portion, and positioning the window and the bonding pads relative to the alignment means;

providing a photonic device having a working portion and mounting the photonic device on the bonding pads of the flexible substrate with the working portion aligned with the window through the flexible substrate; and mounting the first portion of the insulative flexible substrate on the end surface of the waveguide, and locating the window centrally about the core region on the end surface using the alignment features and the alignment means so as to align the working portion of the photonic device with the core region of the waveguide, and mounting the second portion Of the flexible substrate on the interconnect substrate using the alignment means of the flexible substrate and the alignment features of the interconnect substrate to position the flexible substrate.

* * * * *